United States Patent [19]

Baumeister

[11] Patent Number: 4,591,931
[45] Date of Patent: May 27, 1986

[54] PLAYBACK APPARATUS

[75] Inventor: Hans-Peter Baumeister, Churchville, N.Y.

[73] Assignee: Eastman Kodak Company, Rochester, N.Y.

[21] Appl. No.: 720,315

[22] Filed: Apr. 5, 1985

[51] Int. Cl.$^4$ .................. G11B 15/18; G11B 27/02
[52] U.S. Cl. .................... 360/72.1; 360/13; 360/14.3; 360/72.2
[58] Field of Search ............... 360/13, 71, 72.1, 72.2, 360/72.3, 74.4

[56] References Cited

U.S. PATENT DOCUMENTS

| | | | |
|---|---|---|---|
| 3,627,922 | 12/1971 | Goldmark et al. | 178/7.2 R |
| 3,699,247 | 10/1972 | Mashima | 178/6.6 FS |
| 3,724,935 | 4/1973 | Batter, Jr. | 352/38 |
| 3,921,220 | 11/1975 | Primdsch et al. | 360/72 |
| 3,987,484 | 10/1976 | Bosche et al. | 360/33 |
| 4,000,510 | 12/1976 | Cheney et al. | 360/33 |
| 4,009,331 | 2/1977 | Goldmark et al. | 358/127 |
| 4,195,317 | 3/1980 | Stratton | 360/14 |
| 4,210,785 | 7/1980 | Huber et al. | 179/100.1 PS |
| 4,210,940 | 7/1980 | Prysby et al. | 360/33 |
| 4,224,644 | 9/1980 | Lewis et al. | 360/72.2 |
| 4,246,616 | 1/1981 | Hiraguri et al. | 360/10 |
| 4,276,571 | 6/1981 | Sakamoto | 360/10 |
| 4,290,081 | 9/1981 | Foerster | 358/4 |
| 4,302,776 | 11/1981 | Taylor et al. | 358/160 |
| 4,363,043 | 12/1982 | Kitamura et al. | 360/72.1 |
| 4,367,499 | 1/1983 | Hoshino et al. | 360/72.2 |
| 4,403,250 | 9/1983 | Kellar | 358/105 |
| 4,422,105 | 12/1983 | Rodesch et al. | 358/903 |
| 4,425,586 | 1/1984 | Miller | 358/335 |
| 4,445,145 | 4/1984 | Moriya | 360/10.2 |

Primary Examiner—George G. Stellar
Attorney, Agent, or Firm—William F. Noval

[57] ABSTRACT

Apparatus for playing back from recording media (such as magnetic tape) recorded information which includes both preselected segments and unpreselected segments, such as edited video scenes (burst and still) and unedited video scenes. The apparatus includes a memory for storing start and end addresses (which may be the same) of preselected segments recorded on the media, and a device for designating an unpreselected segment for playback such as on a display monitor. The apparatus includes control logic (1) for determining from the stored start and end addresses of preselected segments the start and end addresses of a designated unpreselected segment, and (2) for causing playback of the designated segment.

6 Claims, 9 Drawing Figures

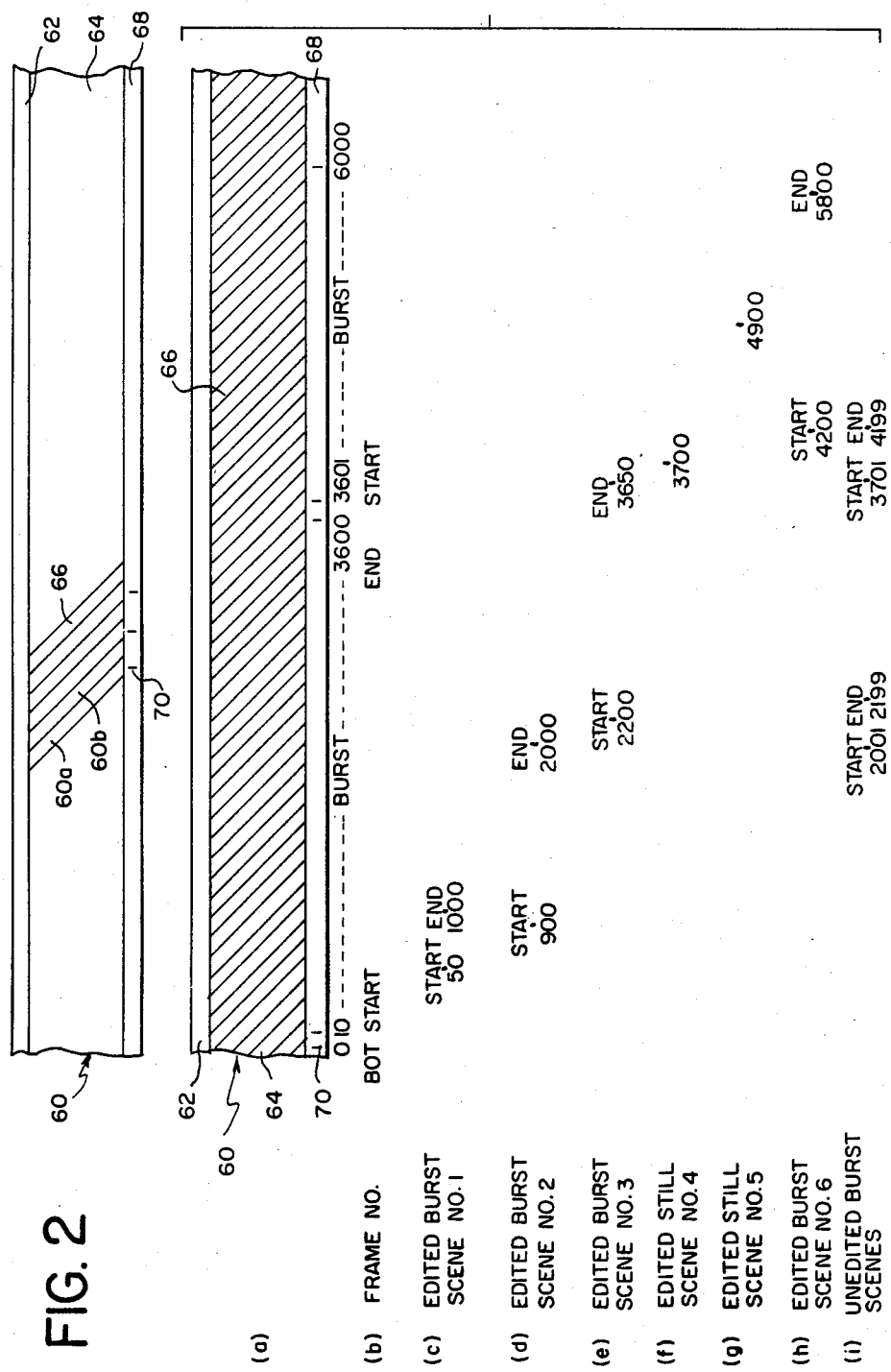

PLAYBACK APPARATUS

BACKGROUND OF THE INVENTION

This invention relates in general to apparatus for playing back from recording media recorded information which includes both preselected segments and unpreselected segments More particularly, the present invention relates to playback apparatus in which unpreselected segments such as unedited video scenes may be automatically played back from recording media such as magnetic tape.

Information recorded on recording media such as magnetic tape or magnetic or optical disc frequently has segments which possess less interest for playback than other segments. Thus, for example, in the recording of program material such as broadcast movies or TV programs, commercials are frequently interspersed between segments of the movie or TV show. When playing back the recorded program, it is desirable to skip the commercials automatically so that the flow of story line or action may be shown unimpeded to the viewer. Similarly, when a video camera is used to record movie sequences, it may be desirable to edit the movie bursts to eliminate out-of-focus or uninteresting scenes. It is also desirable to play back scenes in a different sequence than the sequence in which they were recorded and to designate a sequence of scenes as a file so that they may be played back automatically in the designated sequence upon designation of a file name or number.

One technique for editing recorded information is to review the recorded material, to make a note of selected segments and then to manually duplicate the segments in a selected sequence onto second recording media such as magnetic tape for playback. This technique, however, has several drawbacks. In the reproduction of a duplicate tape, especially when using home video tape recorders, there is a degradation in the quality of the duplicate tape. Moreover, the unedited segments originally recorded would be lost forever if the unedited original tape is recorded over. Moreover, this technique is tedious and time-consuming in requiring the manual control of two tape recorders. It has been proposed (such as in U.S. Pat. Nos. 4,210,785 and 4,210,940) to provide a single video tape recorder for selecting tape segments of a recorded tape for playback in any desired sequence. An operator selects which segments of the tape are to be replayed and in which sequence those segments are to be replayed irrespective of the location of the selected segments on the tape. An electronic controller responsive to the operator's selection causes the recorder to replay selected tape segments in the proper sequence. A similar system is disclosed in U.S. Pat. No. 4,224,644 in which tape positions indicative of the start and stop points of each selection recorded on the tape are stored in a memory and the stored stop and start positions for each selection subsequently recorded at the start of the tape. Thus, the tape may be removed from the recorder and when reinserted for playback, the stop and start positions are read from the tape and utilized for locating the selections on the tape to be played.

Although these devices may be useful for the purposes for which they are intended, it may be desirable to automatically playback unselected or unedited segments from an unedited tape in a simple and efficient manner. The apparatus disclosed above do not provide for simple playback of unselected segments.

SUMMARY OF THE INVENTION

According to the present invention, there is provided playback apparatus in which information recorded on recording media may be edited for playback in any desired sequence. Moreover, the apparatus is capable of automatically playing back unedited scenes in a simple and efficient manner without an operator specifically addressing unedited sequences. The apparatus is further capable of designating a sequence of scenes in any order as a file and of playing back the scenes in the designated order by simply selecting the file number or name. The invention includes identification means for identifying the start and end of preselected segments (edited scenes) recorded on recording media (magnetic tape), means for designating an unpreselected segment (unedited scene) for playback, and control means (1) for determining from the start and end identification means of preselected segments the start and end of said designated unpreselected segment and (2) for causing said play back apparatus to play back the designated unpreselected segment.

The invention and its features and advantages will be set forth and become more apparent in the detailed description of the preferred embodiment presented below.

BRIEF DESCRIPTION OF THE DRAWINGS

In the detailed description of the preferred embodiment of the inventon presented below in which like elements are identified with like numbers, reference is made to the accompanying drawings in which:

FIG. 2 is a schematic representation of a portion of video tape used in the apparatus of FIG. 1;

FIG. 3(a) is a schematic representation of video tape illustrating the frame numbers of recorded segments (burst scenes) on the tape; and FIGS. 3(b)–3(i) are graphic indications of frame numbers of edited and unedited burst and still scenes on the tape portion of FIG. 3a;

DESCRIPTION OF A PREFERRED EMBODIMENT

In the following description, a preferred embodiment of the present invention is described in relation to magnetic tape record and playback apparatus. It will be understood that other recording media may be used, such as magnetic or optical disc and still be within the scope of the present invention. Moreover, the preselected and unpreselected segments recorded on the recording media may comprise other than video information such as audio information or the like. The term "burst" is a sequence of video frames (or fields) recorded on media such as, for example, on the slant tracks of magnetic tape of a consumer video cassette recorder (VCR). A "still" scene is a single video field or frame recorded on the magnetic tape. The selected or edited scenes or segments may include not only segments which are contiguous or are separated from each other, but also segments which overlap each other.

Figure 1:
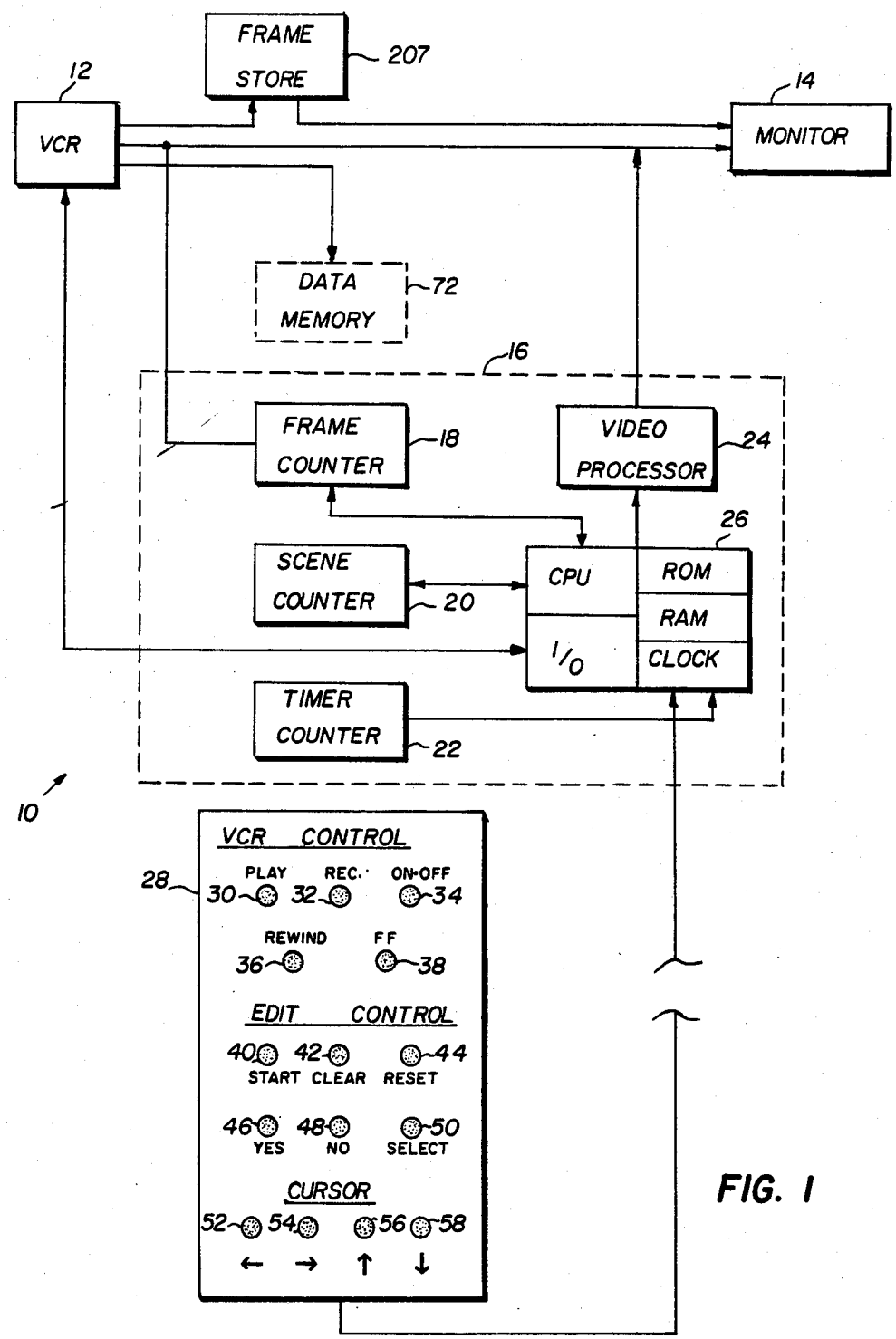
FIG. 1 is a block diagram of play back apparatus incorporating the present invention.

Referring now to FIG. 1, there is shown an illustrative video system incorporating the present invention. As shown, video system 10 includes a recording media record/playback device such as video cassette recorder (VCR) 12 which accepts a cassette of recording tape. It will be understood that other magnetic media devices such as optical or magnetic disc devices may be used. VCR 12 is connected to a monitor 14 for displaying video images on the screen thereof and is controlled by a video editor 16. Editor 16 includes a frame counter 18, a scene counter 20, a timer counter 22, a video processor 24, and a microprocessor 26. Microprocessor 26 may, for example, be any of a variety of microprocessors known to those skilled in the art. An exemplary microprocessor is the 8085 available from the INTEL Company. As is well known in the art, such microprocessors include a central processing unit (CPU), random access memory (ROM), read only memory (ROM) and input/output (I/O). Programming of such microprocessor is well known to those skilled in the art and is described, for example, in the textbook, "THE ART OF ELECTRONICS", by Horowitz and Hill, 1980, Cambridge University Press, New York, N.Y., Chapter 11, page 484 and following.

A manually operable remote control unit 28 is provided with a plurality of control buttons to operate VCR 12 and editor 16. The VCR control buttons include play button 30, record button 32, on/off button 34, rewind button 36, and fast forward button 38. Edit control buttons includes start button 40, "clear" button 42, "reset" button 44, "yes" button 46, "no" button 48, "select" button 50, and cursor buttons 52, 54, 56, and 58. The function of these buttons will be described later in greater detail.

Referring now to FIG. 2, there is shown in diagrammatic form a portion of illustrative magnetic tape 60 used in VCR 12 for recording video information. As shown, magnetic tape 60 includes a longitudinal audio track 62, a video band 64, upon which slant video tracks 66 are recorded and longitudinal control track (CTL) 68 upon which are recorded control marks 70 which identify each video frame recorded on tape 60.

As is well known in the art, consumer VCRs (such as VHS and Beta) record video information on half-inch magnetic tape by means of rotating magnetic heads which lay down slant recording tracks on the tape. A standard composite television signal (NTSC) comprises two fields which are interlaced to form a single picture frame. Thus, a single field is recorded on a single track so that on tracks 66a and 66b are recorded the two fields of a single frame. Each frame is identified by identifying indicia such as control mark 70 on CTL 68 which may be used as a locator along the length of the tape for identification and access purposes.

Referring now to FIG. 3a, there is shown a more extended length of magnetic tape 60 on which video tracks 66 are schematically represented by slant lines. Along CTL 68 are a series of marks which identify video information which has been recorded on tape 60. Each frame is identified by a consecutive number from the beginning of the tape (BOT). Thus, as shown in FIG. 3(b), a video burst (movie) is located on tape 60 from start frame 10 to end frame 3600 and another burst from start frame 3601 to end frame 6000. These bursts may be recorded from a video camera or from broadcast television programming. In the NTSC video standard used in the United States, thirty frames per second are displayed on a television screen so that in recording information to be displayed in the standard format, thirty frames per second or 1,800 frames per minute will be recorded on magnetic tape 60. Thus, the first burst which has approximately 3600 frames extends for a period of almost two minutes.

Since the video scenes recorded on tape 60 may be real time events, they may contain subject matter which the viewer is not interested in seeing upon replay. Thus, when using a video camera to record an event such as a child's birthday party or a travel scene, it may be desirable to delete out-of-focus or boring segments for showing to others. Similarly, broadcast television programs may include commercial segments which break up the continuity of the program and which one desires to delete on later replay. According to the present invention, there is provided a technique for editing recorded material on video tape so that the VCR plays back only selected or edited scenes. The invention also permits rearranging the scenes in any order and identifying the sequence of scenes as a file so that upon a simple indication of file the VCR automatically plays back the scene in the preselected order. Moreover, according to the present invention there is provided a technique for automatically accessing the unedited recorded segments, as will be described in detail later with respect to FIG. 8.

Figure 4:
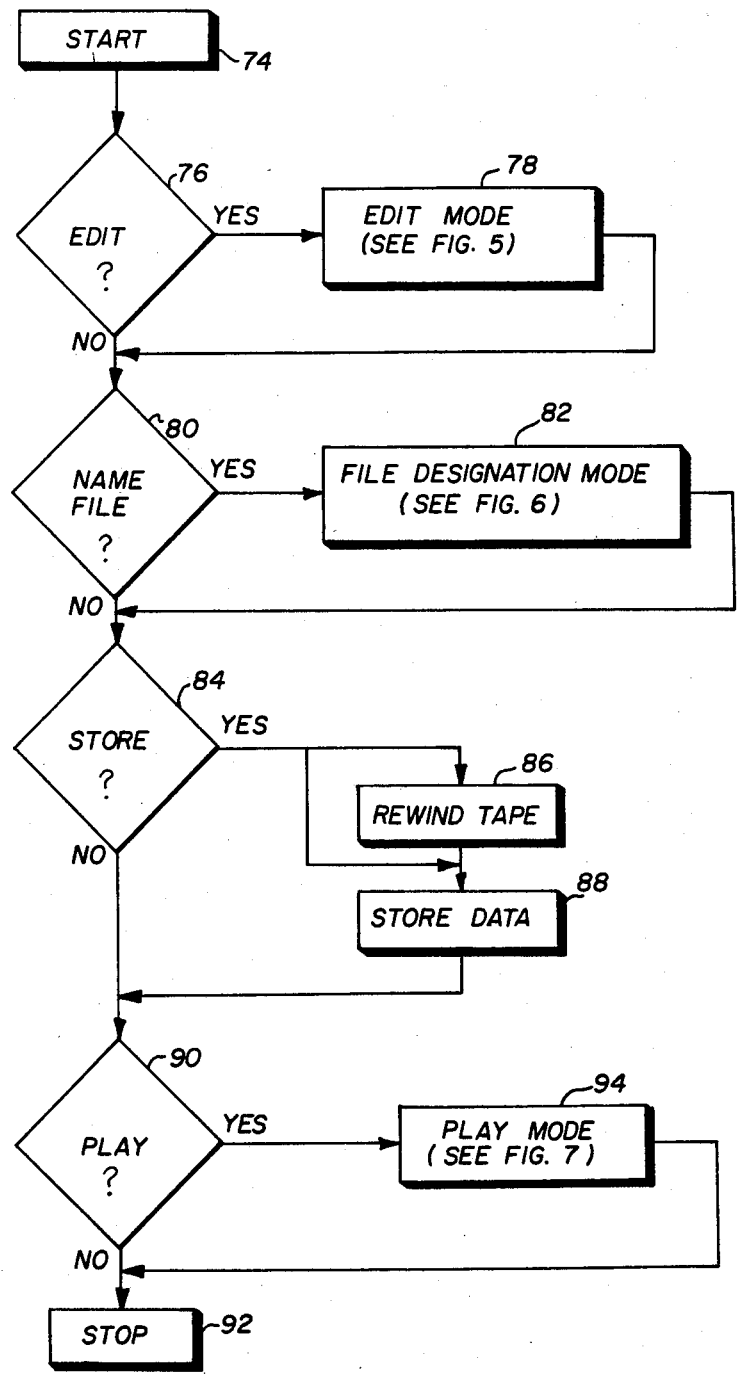
FIG. 4 is a flow diagram of the main menu of the modes of operation of the apparatus shown in FIG. 1.

Video system 10 is an interactive system having several modes of operation under the control of microprocessor 26. Thus, instead of controlling all of the functions of system 10 by means of separate control buttons on remote control 28, many functions may be displayed on monitor 14 and selected by an operator through control of a cursor on the screen of monitor 14 and by edit control buttons 40–58 on control 28. FIG. 4 is a flow diagram of the MAIN MENU of operating modes of video system 10. When the operator has pressed start button 40 (box 74) on remote control 28 the menu will be shown on monitor 14 under control of microprocessor 26 through video processor 24. In the sequence shown the operator first decides (diamond 76) whether or not to operate system 10 in the EDIT MODE. If "yes" button 46 is pressed, the EDIT MODE (FIG. 5) appears on the screen of monitor 14. If "no" button 48 is pressed the operator decides (diamond 80) whether to operate system 10 in the FILE DESIGNATION MODE. If "yes" button 46 is pressed the FILE DESIGNATION MODE flow diagram of FIG. 6 (box 82) appears on the screen. If "no" button 48 is pressed the program proceeds to the "store" decision (diamond 84). If the EDIT MODE and/or FILE DESIGNATION MODE have been selected and completed, the operator presses "yes" button 46 to store the data produced during these modes directing in data memory 72 (box 88). Memory 72 may, for example, be a magnetic stripe on a video cassette inserted into VCR 12. Alternatively, tape 60 may be rewound (box 86) and the data recorded (stored) (box 88) on the beginning of tape 60.

The operator then decides (diamond 90) whether or not system 10 is to operate in the PLAY MODE. If not, system 10 is stopped by pressing "no" button 48 (box 92). If the decision is "yes", the operator presses button 46 to display the PLAY MODE flow diagram of FIG.

7 (box 94) on TV 14. During the PLAY MODE the operator can select an unedited segment for automatic replay by VCR 12.

Figure 5:
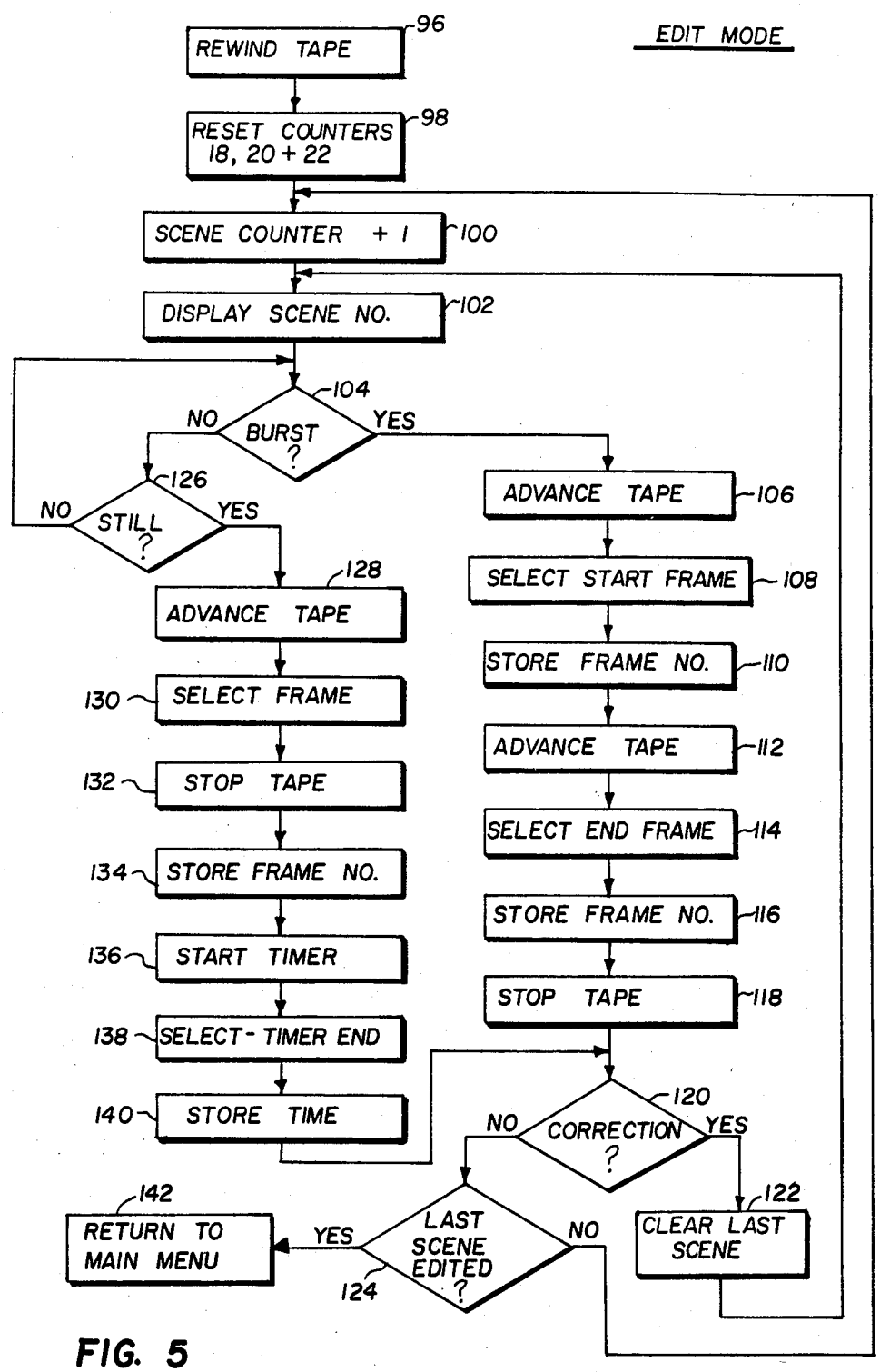
FIG. 5 is a flow diagram of the EDIT MODE of operation of the apparatus of FIG. 1.

Referring now to FIG. 5, there is shown a flow diagram of the EDIT MODE of video system 10. When this mode is chosen (box 78, FIG. 4), microprocessor 26 causes VCR 12 to rewind magnetic tape contained in a cassette inserted into VCR 12 to the beginning of the tape (box 96) and to reset scene counter 20, frame counter 18 and timer counter 22 (box 98). Thereafter scene counter 20 is incremented by one (box 100) and the scene number is displayed on monitor 14 (box 102). The operator decides whether the edited scene is a burst or not. If "yes" button 46 is actuated (diamond 104) the tape is advanced to play the first burst on monitor 14 (box 106). As the operator watches the played-back scene, when a frame is displayed that the operator decides is the start of a burst, he actuates select button 50 on control 28 (box 108) to store the start frame number (box 110) in the random access memory (RAM) of microprocessor 26. Thus, for edited burst scene No. 1 (FIG. (c)), frame 50 is stored as the start frame.

Microprocessor 26 causes VCR 12 to advance the tape forward (box 112) as the operator continues to view the burst on monitor 14. The end of the scene is selected (box 114) by actuating "select" button 50. The end frame number (such as frame 1,000, FIG. 3(c)) is stored in the RAM of microprocessor 26 (box 116) and the tape is stopped (box 118). The operator decides (diamond 120) whether a correction should be made. If "yes" button 46 is actuated, the last scene is cleared from RAM (box 122) and the routine is returned to box 102. If "no" button 48 is actuated, the operator decides (diamond 124) whether the edited scene was the last such scene to be edited. If "yes" button 46 is actuated, the routine is returned to the main menu (box 142). If "no" button 48 is actuated the routine is returned to box 100. Burst scene Nos. 2 and 3 may be chosen (FIGS. 3(d) and 3(e)), and their respective start frame numbers (900, 2200) and end frame numbers (2000, 3650) stored in RAM.

If the operator decides that the scene is not a burst scene (diamond 104) but rather a still scene (diamond 126), the operator presses "yes" button 46; microprocessor 26 then advances tape in VCR 12 in the selected direction (box 128). By actuating "select" button 50 (box 130), microprocessor 26 causes VCR 12 to stop the tape (box 132) and to store the frame number of the still scene in RAM (box 134). Timer counter 22 is started to receive timing pulses from the clock of microprocessor 26 (box 136). The operator actuates "select" button 50 at the end of the desired time period for showing the still scene (box 138). This time is stored in RAM (box 140). Thus, as shown in FIGS. 3(f) and 3(g) edited still scene No. 4 is stored as frame number 3700 and edited still scene No. 5 is stored as frame number 4900.

After the still scenes have been selected, the operator may wish to select another burst scene (such as scene No. 6, FIG. 3(h), which starts at frame 4200 and ends at frame 5800). It will be noted that burst scene No. 6 encompasses still scene No. 5.

After all the edited scenes have been chosen, the operator decides (diamond 124) whether the last scene on tape has been edited. If the decision is "yes", the routine is returned to the main menu (box 142).

Figure 6:
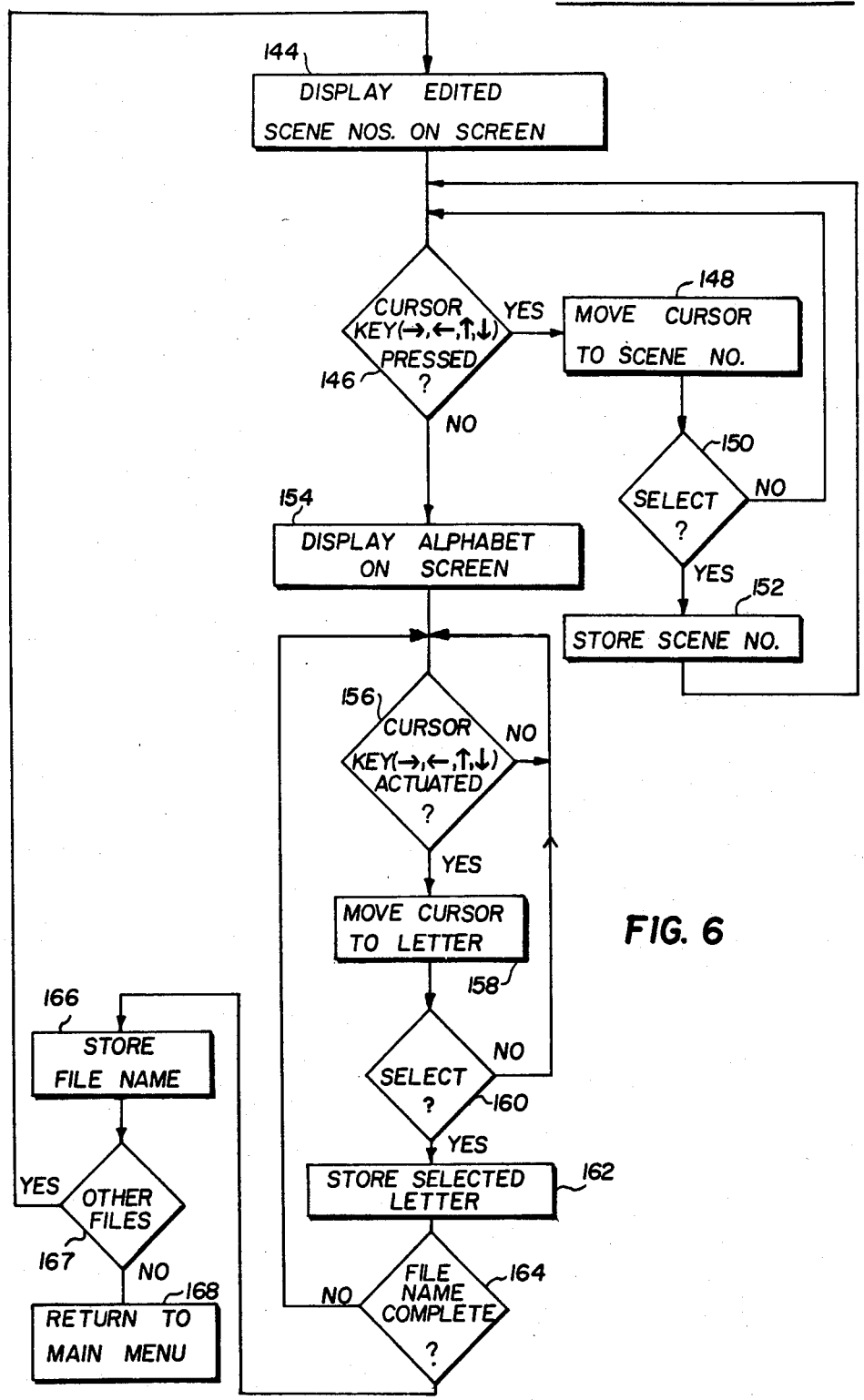
FIG. 6 is a flow diagram of the FILE DESIGNATION MODE of operation of the apparatus of FIG. 1.

If the FILE DESIGNATION MODE is selected (box 82, FIG. 4), the routine shown in FIG. 6 is executed. The edited scene numbers are displayed on monitor 14 (box 144). If the operator decides (diamond 146) to actuate one of the cursor keys 52, 54, 56, 58, the cursor on the screen of monitor 14 is moved to a displayed scene number (box 148). The operator then depresses select button 50 (diamond 150) to store this scene number in RAM (box 152). This routine is repeated for each scene which is to be stored in the file. For example, edited scenes Nos. 1-6 (FIGS. 3(c)-3(h)) may be selected to be played back in the sequence-scenes 6, 3, 1, 5, 2, 4.

The next routine is to select a name for the file. The alphabet is displayed on monitor 14 (box 154) and the operator decides (diamond 156) to actuate a cursor key 52-58 to move the cursor to the desired letter (box 158). By actuating "select" button 50 (diamond 160), the letter is stored in the RAM memory of microprocessor 26 (box 162). The same routine is repeated until the file name is completed (diamond 164). The file name is stored in RAM (box 166) and the routine is returned to the main menu if no further files are to be named (decision 167, box 168). If additional files are to be named, the FILE DESIGNATION MODE may be repeated for each group of selected scenes (decision 167).

After all of the editing and file designation selection routines have been completed, the operator decides (diamond 84, FIG. 4) to permanently record the scene numbers and file names temporarily stored in RAM in a data area such as at the beginning of the tape or on a magnetic strip on the cassette (boxes 86, 88).

Figure 7A:
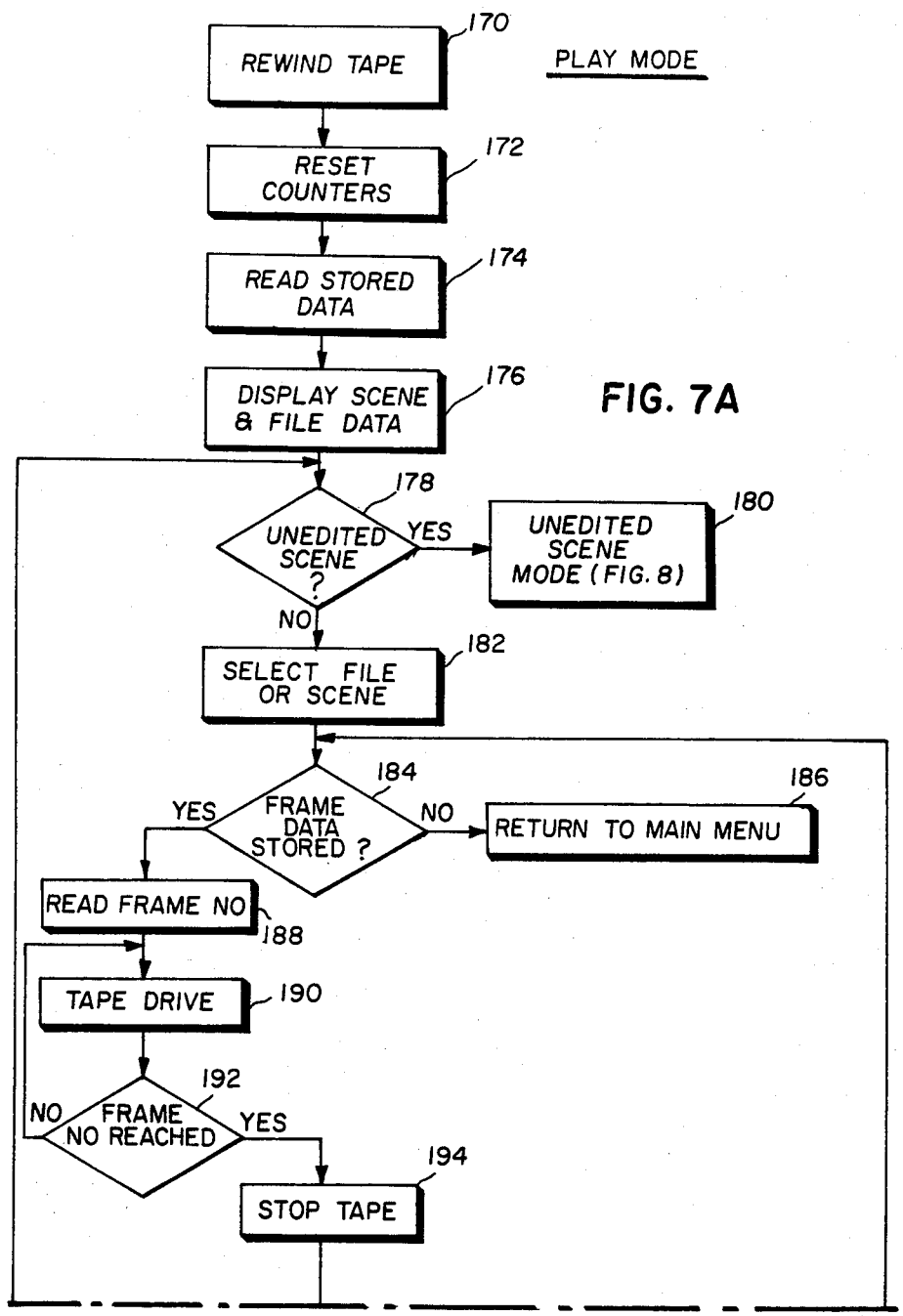
FIGS. 7A and 7B are flow diagrams of the PLAY MODE of operation of the apparatus of FIG. 1.
Figure 7B:
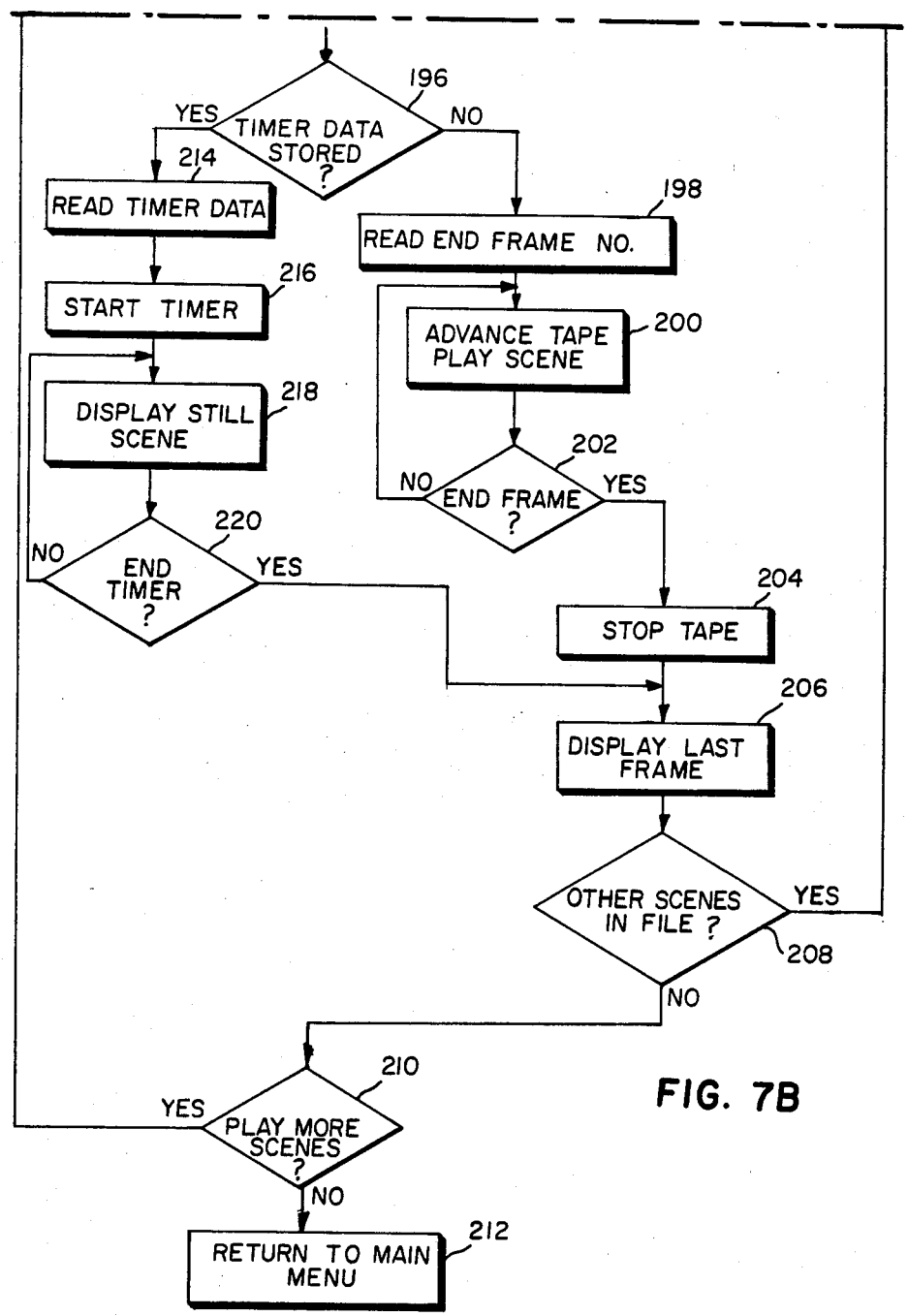

Thereafter, the tape cassette may be removed from VCR 12 with the selected scenes and files recorded in the appropriate data store associated with that cassette. When the tape is replayed, the PLAY MODE routine (FIG. 7) of system 10 is executed. When the "play" button 30 of control 28 is depressed after an edited tape cassette is inserted in VCR 12, microprocessor 26 causes the tape within the inserted cassette to be rewound (box 170). Scene counter 20, frame counter 18 and timer counter 22 are reset (box 172), data relating to scene and file are read from the beginning of the tape or from the video cassette (box 174), and the scene and file data are displayed on monitor 14 (box 176). The operator then decides whether the UNEDITED SCENE MODE is desired (diamond 178). If "no" button 48 is actuated, the operator selects a displayed file or scene by means of cursor buttons 52-58 (box 182). After the file or scene has been selected, microprocessor 26 determines whether frame data is stored for the selected scene or for the first scene of a designated file. If such data is not stored, then the routine is returned to the main menu (box 186). If frame data is stored (diamond 184), the start frame number is read from memory (box 188); microprocessor 26 then drives the tape in VCR 12 at an appropriate fast or slow speed in the appropriate direction (box 190) until the desired frame number is reached (diamond 192). The tape is then stopped with the appropriate frame situated at the playback heads of VCR 12 (box 194).

If timer data are not stored (diamond 196), the scene to be displayed is determined as a burst scene and the routine branches to the right. The end frame number is read (box 198) and the tape is advanced to play the edited burst scene (box 200). When the end frame number of the scene is reached, the tape is stopped (box 204) and the last frame of the scene (or a video graphic) is displayed on monitor 14 (box 206), either from a frame store 207 (FIG. 1) or by the playback heads of VCR 12. If there are other scenes in the file (diamond 208), the routine is returned to diamond 184 for playback of the remaining scenes. If there are no other scenes, then the operator decides (diamond 210) whether he wishes to play more edited scenes or files. If he does not, then the routine is returned to the main menu (box 212). If he does, the routine is returned to the diamond 178.

If at diamond 196 it was determined that timer data was stored, a still scene is identified. Microprocessor 26 reads the timer data from memory (box 214), timer counter 22 is started (box 216) and the still scene is displayed on monitor 14 (box 218). When the selected time period has expired (diamond 220), the routine is continued at box 206.

Figure 8:
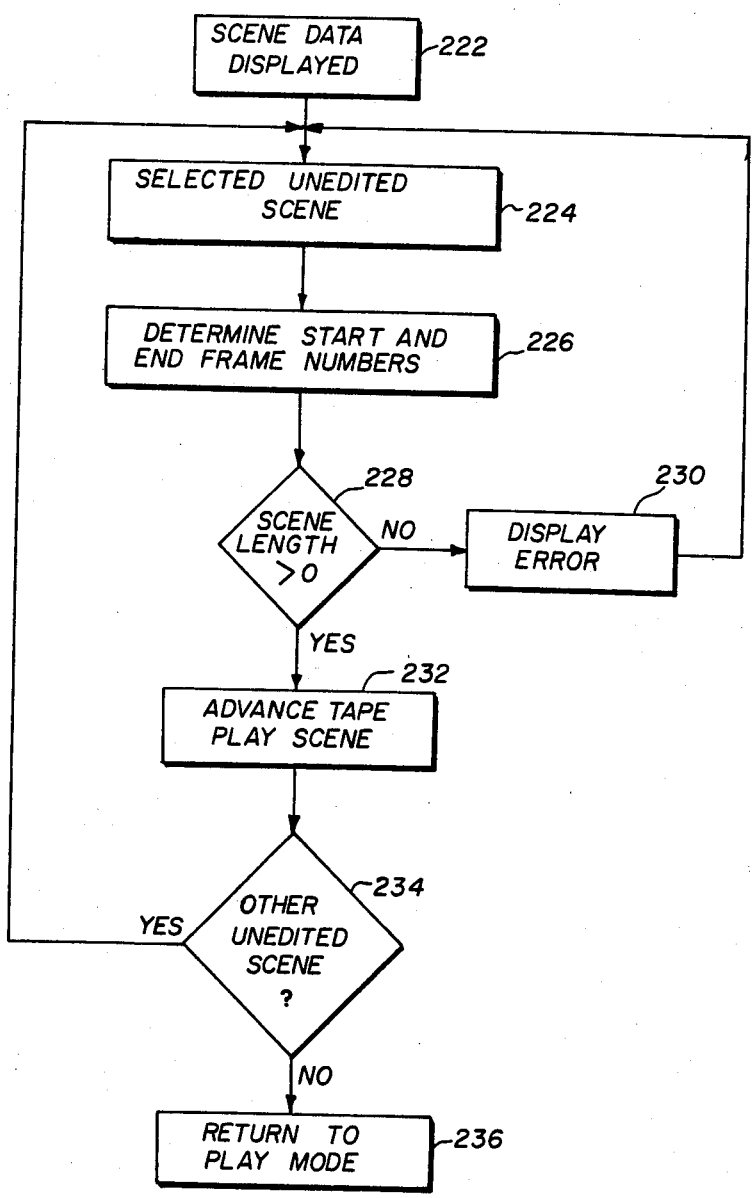
FIG. 8 is a flow diagram of the UNEDITED SCENE MODE of the apparatus of FIG. 1.

If the operator decided (diamond 178) to play an unedited scene instead of an edited scene or file, then the UNEDITED SCENE MODE of FIG. 8 would be executed. The first step of this routine is to display the scene data on monitor 14 (box 222). The operator selects a segment of the tape which has not been edited i.e. which is between two sequential edited scenes by pressing "select" button 50. Microprocessor 26 determines from the end frame number of the lowest number scene and from the start frame number of the next consecutive scene what the start and end frame numbers are of the unedited scene (boxes 224 and 226). Microprocessor 26 then determines whether the scene frame length is greater than zero (diamond 228). If the scene length is not greater than zero, an error signal will be displayed on monitor 14 (box 230) and the routine will be returned to box 224. If the unedited scene length is greater than zero indicating that there is an unedited segment between the scene numbers, the tape is driven to the start frame of the unedited scene and the tape is played until the end frame of the unedited scene is reached (box 232). For example, referring to FIG. 3i, if the operator desires to play back an unedited scene between edited burst scene No. 2 and edited burst scene No. 3, microprocessor 26 determines from the end frame address 2000 of scene No. 2 and the start frame address 2200 of scene No. 3 that the start frame address for the unedited scene is 2001 and the end frame address for the unedited scene is 2199. VCR 12 is then instructed to play the unedited scene for display on monitor 14 (box 232).

The operator then decides (diamond 234) whether other unedited scenes are to be played. If "yes" button 46 is actuated, the routine is returned to box 224 and other unedited scenes are played back. If "no" button 48 is actuated, the routine is returned to the PLAY MODE (box 236).

Although scenes have been identified with "frame" addresses it will be understood that other identifying means such as field address or the like may identify edited and unedited segments of recorded information. If the recording media is magnetic tape, the information may be recorded on a portion of a track or a plurality of tracks per "frame" or "field". Other identifying means than addresses stored in memory may be provided, such as coded information on the tape adjacent to the edited or unedited information. It will be understood that a "still" scene may occupy a single field, a frame or a plurality of frames as recorded on recording media.

Thus it is seen that a video system is provided which has the main advantage of providing the operator with the ability to select unedited scenes for automatic playback without the necessity of entering separate addresses of the scene in the VCR control logic or without the necessity of playing back undesired edited scenes. Moreover, the video system is capable of allowing an operator to edit both still and burst scenes on unedited recorded media such as magnetic tape. Further, the edited scenes may be arranged in any sequence and may be designated by a file name. Upon play back the operator need only identify the file name and the video cassette recorder (or other recording media device) will automatically play back the scenes in the preselected sequence.

The invention has been described in detail with particular reference to preferred embodiments thereof but it will be understood that variations and modifications can be affected within the scope and spirit in the invention.

What is claimed isL

1. The invention comprising:
   playback means for playing back from recording media recorded information which includes both preselected segments and unpreselected segments;
   identification means for identifying the start and end of preselected segments recorded on said media;
   means for designating an unpreselected segment for playback; and
   control means (1) for determining from said start and end identification means of said preselected segments the start and end of said designated unpreselected segment; and (2) for causing said playback means to play back said designated unpreselected segment.

2. The invention of claim 1 wherein said playback means includes a video tape recorder for playing back video scenes recorded on magnetic tape, said scenes including both preselected scene bursts or stills and unpreselected scene bursts or stills.

3. The invention of claim 2 including monitor means for displaying video scenes designated for playback.

4. The invention comprising:
   monitor means for playing back video scenes recorded on magnetic tape;
   means for successively selecting the start and end positions of scenes selected for playback;
   memory means for storing the start and end addresses of selected scenes and an assigned scene identifier for each selected scene;
   means for designating for playback a scene which has not been selected for playback; and
   control means (1) for determining the start and end addresses of said designated scene from the stored start and end addresses of selected scenes; and (2) for causing said playback means to playback said designated unselected scene.

5. The invention of claim 4 wherein said selecting means includes means for selecting still scenes recorded on said magnetic tape; wherein said memory means stores the address of each selected still scene and its assigned scene identifier and wherein said control means includes means for determining the address of unselected still scenes as well as unselected burst scenes.

6. The invention of claim 4 including means for categorizing a sequence of selected scenes with a file identifier; wherein said memory means includes means for storing said file identifiers; and wherein said control means is of a type which causes said playback means to playback selected scenes in the order selected upon designation of a file for playback.

* * * * *